US007598074B2

(12) United States Patent
Hoshina et al.

(10) Patent No.: US 7,598,074 B2
(45) Date of Patent: Oct. 6, 2009

(54) SYSTEM AND METHOD FOR CLEANING CONTAMINATED MATTER COMPRISING DIOXINS AND PREPARATION FOR DECOMPOSING DIOXINS

(75) Inventors: Sadayori Hoshina, Tokyo (JP); Atsushi Takahashi, Ebina (JP); Noboru Iiyama, Toride (JP); Hitoshi Inaba, Sagamihara (JP)

(73) Assignees: Takasago Thermal Engineering Co., Ltd., Tokyo (JP); Engineering Advancement Association of Japan, Tokyo (JP)

( * ) Notice: Subject to any disclaimer, the term of this patent is extended or adjusted under 35 U.S.C. 154(b) by 753 days.

(21) Appl. No.: 10/804,746

(22) Filed: Mar. 19, 2004

(65) Prior Publication Data

US 2005/0208642 A1 Sep. 22, 2005

(30) Foreign Application Priority Data

Mar. 20, 2003 (JP) ............................. 2003-077565

(51) Int. Cl.

| | |
|---|---|
| ***C02F 3/34*** | (2006.01) |
| ***A62D 3/00*** | (2007.01) |
| ***A62D 3/02*** | (2007.01) |
| ***B09B 3/00*** | (2006.01) |
| ***B09C 1/10*** | (2006.01) |

(52) U.S. Cl. .................... 435/262.5; 435/262; 435/264; 435/289.1; 435/307.1; 435/309.1; 435/176; 435/299.1; 435/304.1; 435/305.1; 210/615

(58) Field of Classification Search ................. 435/262, 435/262.5, 264, 289.1, 307.1, 309.1, 176, 435/299.1, 304.1, 305.1; 210/615

See application file for complete search history.

(56) References Cited

U.S. PATENT DOCUMENTS 4,859,594 A * 8/1989 Portier ....................... 435/448

(Continued)

FOREIGN PATENT DOCUMENTS

JP 51-082781 7/1976

(Continued)

OTHER PUBLICATIONS

Sadayori Hoshina, Midori Kono, Horoshi Goda, Toru Furuichi; Dioxins Decomposition Experiments by Thermophilici Microorganism, and Analysis of Gene Thereof; Proceedings of the $10^{th}$ Annual Conference of The Japan Society of Waste Management Experts; Oct. 26-28, 1999; Ohmiya Sonic City.

(Continued)

*Primary Examiner*—William H Beisner
*Assistant Examiner*—Nathan A Bowers
(74) *Attorney, Agent, or Firm*—Alston & Bird LLP

(57) ABSTRACT

A reaction tank (5) holds crushed cells comprising a pellicle of *Bacillus midousuji* cultured in the presence of a chlorinated aromatic compound such as dioxins and holds wastewater comprising a contaminated matter such as fly ash which comprises dioxins and which is produced by washing of a facility such as an incinerator. Air is supplied by a blower (6) to a matter held in the reaction tank (5). Accordingly, dioxins having three or more chlorine atoms in the contaminated matter can be decomposed, and the contaminated matter can be easily cleaned at a site where dioxins generate such as a washing or dismantling site of an incineration facility.

7 Claims, 7 Drawing Sheets

U.S. PATENT DOCUMENTS

| | | | | |
|---|---|---|---|---|
| 5,563,066 | A * | 10/1996 | Buchanan | 435/264 |
| 6,190,903 | B1 * | 2/2001 | Weinstein et al. | 435/252.5 |
| 6,337,204 | B1 * | 1/2002 | Monot et al. | 435/282 |
| 6,420,165 | B1 * | 7/2002 | Weinstein et al. | 435/262.5 |
| 6,521,444 | B1 * | 2/2003 | Numata et al. | 435/262.5 |
| 6,723,242 | B1 * | 4/2004 | Ohkata et al. | 210/601 |

FOREIGN PATENT DOCUMENTS

| | | | |
|---|---|---|---|
| JP | 52-057389 | | 5/1977 |
| JP | 2000-328815 | | 11/2000 |
| JP | 2001-090353 | A | 4/2001 |
| JP | 2002-028695 | A | 1/2002 |
| JP | 2002-172364 | | 6/2002 |
| JP | 2002-301466 | A | 10/2002 |
| JP | 2002-336815 | | 11/2002 |
| JP | 2002 348291 | A | 12/2002 |

OTHER PUBLICATIONS

Masaya Nakamura, Shojiro Hishiyama, Yuichiro Ohtsuka, Takashi Kobayashi, Yoshihiro Katayama; Screening of Dioxin Decomposing Micro-Organism by a Novel Dioxin Analogous Compound; The Journal of Nippon Nogei Kagaku Kai; Mar. 2001; p. 153.

Notice of Reason for Rejection issued May 19, 2009 in Corresponding Japanese Patent Appl. No. 2004-08553 with English translation.

Yuichiro Otsuka, et al.; *Research on Decomposing Function s of Novel Chlorinated Dioxin-Decomposing Microorganisms*; Summary of Annual Meeting of Japan Society for Bioscience, Biotechnology, and Agrochemistry, Mar. 5, 2003; p. 82 (with English translation); vol. 2003; Japan.

* cited by examiner

SYSTEM AND METHOD FOR CLEANING CONTAMINATED MATTER COMPRISING DIOXINS AND PREPARATION FOR DECOMPOSING DIOXINS

BACKGROUND OF THE INVENTION

1. Field of the Invention

The present invention relates to a cleaning system and cleaning method of decomposing dioxins contained in a contaminated matter which comprises the dioxins using crushed cells or fractions thereof of microorganisms in an aqueous medium and a preparation for decomposing dioxins, which is used for cleaning of the contaminated matter.

2. Description of the Related Art

Operation or supervision of facilities which emit dioxins such as incinerators has been regulated by law at present, and emission of dioxins is prevented. However, existing facilities which do not meet the standards of the law require operations such as dismantling and improvement. In such an operation, a contaminated matter containing dioxins generates in various forms. A technique for decomposing dioxins by using microorganisms is known as a preferable technique for cleaning a contaminated matter by decomposing dioxins in the contaminated matter.

Examples of a known technique for decomposing dioxins by using microorganisms include a method for treating a liquid containing dioxins (see JP 2002-028695 A, for example). The method includes at least: a primary step of trapping dioxins in a liquid containing dioxins by adsorption or sorption of the dioxins to a solid and concentrating; a secondary step of subjecting the treated liquid containing the solid with concentrated dioxins to solid-liquid separation for obtaining dioxin-free separated water and concentrated slurry; and a tertiary step of subjecting the concentrated slurry to biological treatment for decomposing the dioxins in the concentrated slurry. The biological treatment in the tertiary step employs a wood-rotting fungi and/or an enzyme in which the wood-rotting fungus produces.

Further examples of the known technique for decomposing the dioxins by using microorganisms include a demolishing method of structure polluted with dioxins (see JP 2001-090353 A, for example). The method is characterized by including: secluding an incinerator facility contaminated with dioxins from a surrounding environment; allowing a composition containing a microorganism having an ability of decomposing dioxins and containing a coat forming immobilizing agent to adhere to inner walls of the incineration facility; and demolishing the incineration facility. A wood-rotting fungus such as a white-rot fungus of Basidiomycetes is used as a preferable microorganism.

Further, *Bacillus midousuji* is known as a microorganism for decomposing dioxins (see Sadayori Hoshina et al., "Decomposition experiment of dioxins by thermophile and gene analysis", Collected Papers II from 10th Annual Conference of The Japan Society of Waste Management Experts, The Japan Society of Waste Management Experts, p. 883-885, 10.10.1999, for example), and a method for cleaning a contaminated matter using *Bacillus midousuji* is known (see JP 2002-301466 A, for example).

However, in the conventional techniques, decomposition activities of the fungus or produced enzymes thereby may be lost with dioxins having three or more chlorine atoms depending on the fungus or the enzymes thereby used. The loss of the decomposition activities probably results from inactivation of enzymes produced by fungus, which cannot act on dioxin decomposition such as dechlorination due to steric hindrance of chlorine atoms bonded to skeleton structures of dioxins.

Further, handling of the contaminated matter containing dioxins has been also now stipulated by law in detail recently. Thus, dioxins are desirably decomposed at sites in which the contaminated matter generates without transporting the contaminated matter to facilities such as treatment plants. However, decomposition of dioxins by using fungus at a site in which the contaminated matter generates requires the formation of an environment allowing the fungus to survive at the site in which the contaminated matter generates or during the contaminated matter is cleaning (adjustment of temperature, pH, or salt concentration, use of medium, and the like). Consideration on simplification or efficiency improvement of the cleaning system is still needed.

SUMMARY OF THE INVENTION

An object of the present invention is to enable decomposition of dioxins having three or more chlorine atoms in a contaminated matter and to easily clean the contaminated matter at a site in which the dioxins generate such as a washing or dismantling site of an incineration facility.

The inventors of the present invention have found out that crushed cells containing a pellicle of *Bacillus midousuji* cultured in the presence of a chlorinated aromatic compound having a substituent containing an oxygen atom bonded to an aromatic ring and having a chloro group bonded to an aromatic ring decompose dioxins having even three or more chlorine atoms, to thereby complete the present invention.

That is, the present invention provides a system for cleaning a contaminated matter comprising dioxins by decomposing the dioxins in the contaminated matter, wherein the system comprises a reaction tank holding at least: at least one of crushed cells and fractions thereof (hereinafter, at least one of crushed cells and fractions thereof may also be referred to as "crushed cells or the like") comprising a pellicle of *Bacillus midousuji* cultured in the presence of a chlorinated aromatic compound having a substituent comprising an oxygen atom bonded to an aromatic ring and having a chloro group bonded to an aromatic ring; the contaminated matter; and an aqueous medium.

The crushed cells or the like comprising a pellicle of *Bacillus midousuji* break an ether bond peculiar to dioxins, as evidenced by results of studies described below. Thus, the constitution allows decomposition of dioxins through a reaction between the crushed cells or the like and the contaminated matter in the reaction tank, regardless of the number of chlorine atoms in dioxins. Further, the constitution employs the crushed cells or the like, thereby not requiring facilities for maintaining life or activity of the microorganisms or a strict maintenance of environment, compared to cleaning techniques employing the microorganisms. Therefore, the system of the present invention allows easy control of cleaning the contaminated matter and easy cleaning of the contaminated matter.

Further, the system of the present invention preferably comprises a filtration means for separating the aqueous medium and a solid matter from a matter held in the reaction tank to remove the aqueous medium. Such a constitution allows removal of the aqueous medium alone from the matter held in the reaction tank and easily controls concentration of the contaminated matter in the matter held in the reaction tank. Thus, the constitution is preferable for controlling contact of the crushed cells or the like with the contaminated matter and enhancing efficiency of cleaning of the contaminated matter.

Further, the system of the present invention preferably comprises: a seclusion means for secluding a source of the contaminated matter; a fluid production means for producing fluid comprising the contaminated matter by soaking the contaminated matter from the source of the contaminated matter in at least water; and a fluid transport means for transporting the fluid comprising the contaminated matter toward the reaction tank. Such a constitution prevents scattering of the contaminated matter from the source of the contaminated matter to surroundings and prevents scattering of the contaminated matter during transport of the contaminated matter. Thus, such a constitution is preferable for cleaning the contaminated matter comprising dioxins at a site such as a dismantling site of an incinerator or a soil conditioning site at a vacant lot of an incineration facility.

Further, the system of the present invention preferably comprises the fluid production means which is a means of washing the contaminated matter for washing the contaminated matter down by jetting at least water to the source of the contaminated matter. Such a constitution allows use of washing wastewater of the contaminated matter adhering to facilities as it is for cleaning the contaminated matter, for dismantling of an incinerator or improvement work of an incineration facility. Thus, such a constitution is preferable for cleaning the contaminated matter at a site with a simple constitution.

Further, the present invention provides a method of cleaning a contaminated matter comprising dioxins by decomposing the dioxins in the contaminated matter, wherein the method comprises: mixing crushed cells or the like comprising a pellicle of *Bacillus midousuji* cultured in the presence of a chlorinated aromatic compound having a substituent comprising an oxygen atom bonded to an aromatic ring and having a chloro group bonded to an aromatic ring, the contaminated matter, and an aqueous medium.

According to the method described above, the crushed cells or the like and the contaminated matter are brought into contact with each other, thereby allowing decomposition of dioxins regardless of the number of chlorine atoms. Further, the method employs the crushed cells or the like, thereby not requiring facilities for maintaining life or activity of the microorganisms, compared to cleaning techniques employing the microorganisms. Therefore, the method of the present invention allows easy control of conditions for cleaning the contaminated matter and easy cleaning of the contaminated matter.

Further, the method of cleaning of the present invention comprising: separating a solid matter and the aqueous medium from a mixture to obtain the aqueous medium in which the solid matter is removed, is preferable for controlling the concentration of the contaminated matter in the mixture easily, controlling contact of the crushed cells or the like with the contaminated matter, and enhancing efficiency of cleaning of the contaminated matter.

Further, the method of cleaning of the present invention comprising secluding a source of the contaminated matter, soaking the contaminated matter generated from the secluded source of the contaminated matter in water, and mixing the crushed cells or the like with the water comprising the contaminated matter prevents scattering of the contaminated matter from the source of the contaminated matter to the surroundings and prevents scattering of the contaminated matter during transport of the contaminated matter. Thus, such a step is preferable for cleaning the contaminated matter comprising dioxins at a site such as a dismantling site of an incinerator or a soil conditioning site at a vacant lot of an incineration facility.

Further, the method of cleaning of the present invention comprises mixing of the crushed cells or the like with water slurry comprising the contaminated matter, which is discharged through one method of a high pressure water washing method for washing the contaminated matter down by jetting water under high pressure to the source of the contaminated matter and a wet sandblast method for washing the contaminated matter down by jetting water and abrasive grains under high pressure to the source of the contaminated matter. The method allows use of washing wastewater of the contaminated matter as it is for cleaning the contaminated matter, for dismantling of an incinerator or improvement work of an incineration facility, and is thus preferable for cleaning the contaminated matter at a site with a simple facility.

In the present invention, the contaminated matter is cleaned by decomposing dioxins in the contaminated matter comprising the dioxins. “Dioxins” is a generic term for all of polychlorinated dibenzo-p-dioxin, polychlorinated dibenzofuran, and coplanar PCB (polychlorinated biphenyl), and refers to a part or all of the above compounds according to the present invention unless otherwise noted.

The present invention employs the crushed cells or the like comprising a pellicle of *Bacillus midousuji* cultured in the presence of a chlorinated aromatic compound having a substituent comprising an oxygen atom bonded to an aromatic ring and having a chloro group bonded to an aromatic ring. *Bacillus midousuji* is gram-positive *bacillus* which requires temperature of 62° C. or above for the growth thereof and is a thermophile capable of growing even at 90° C. Specific examples of the *bacillus* include a *Bacillus midousuji* SH2A strain, a *Bacillus midousuji* SH2B-J1 strain, and a *Bacillus midousuji* SH2B-J2 strain. Such *Bacillus midousuji* strains are deposited at National Institute of Advanced Industrial Science and Technology with accession numbers ATCC 55926 and ATCC 202050.

*Bacillus midousuji* for obtaining the crushed cells or the like is cultured in the presence of a chlorinated aromatic compound having a substituent comprising an oxygen atom bonded to an aromatic ring and having a chloro group bonded to an aromatic ring. The chlorinated aromatic compound used in the present invention is not particularly limited as long as the compound is an aromatic compound having a substituent comprising an oxygen atom bonded to an aromatic ring and having a chloro group bonded to an aromatic ring. Examples of such a compound include dioxins and chlorinated aromatic compounds such as chlorinated phenol which are less toxic compared to dioxins.

*Bacillus midousuji* can be cultured in the presence of one or more kinds of the chlorinated aromatic compound. Further, a form of the chlorinated aromatic compound in culture of *Bacillus midousuji* is not particularly limited. The chlorinated aromatic compound may be used in a form of a purified product or a form of a composition containing the chlorinated aromatic compound. Examples of the composition containing the chlorinated aromatic compound include fly ash and contaminated soil polluted with the chlorinated aromatic compound.

The culture of the *Bacillus midousuji* specifically involves: mixing dioxins, a dioxin-containing substance such as fly ash and chlorinated phenol with a medium such as a liquid medium as a nutrient source of *Bacillus midousuji*; supplying oxygen to the medium by air blow or the like; and controlling the temperature of the medium to 62° C. or above, which allows activity of the *Bacillus midousuji*.

Concentration of the chlorinated aromatic compound in the culture of *Bacillus midousuji* is preferably 1 ng/L-medium to 0.1 ng/L-medium in view of obtaining crushed cells or the like exhibiting a sufficient dioxin decomposition activity. Further, a medium generally used for culture of *Bacillus bacteria* can be used for the culture medium of *Bacillus midousuji* except that dioxins and the contaminated matter containing the dioxins or the like is mixed into the medium. Examples of a means that can be used for culturing *Bacillus midousuji* in the presence of the chlorinated aromatic compound include an apparatus for cleaning a contaminated matter disclosed in JP 2002-301466 A.

Other substances suitable for the culture of *Bacillus midousuji* can be added to the culture of *Bacillus midousuji*. Examples of such other substances include: activators such as calcium ions for activating a proliferation reaction of *Bacillus midousuji*; lysis inhibitors such as dimethylsulfoxide (hereinafter, may be referred to as "DMSO") acting on lysis inhibition of *Bacillus midousuji* by inhibiting an activity of protease; yeast; and carriers such as zeolite particles for carrying one or both of the *Bacillus midousuji* and dioxins for enhancing contact between the *Bacillus midousuji* and dioxins.

The crushed cells comprising a pellicle of the *Bacillus midousuji* can be obtained through a method generally used for obtaining crushed cells comprising a pellicle of microorganisms. For example, such a method includes the steps of: crushing the bacterial cells by ultrasonic, compression, addition of a cell membrane degrading enzyme, or the like; and accordingly separating a pellicle fraction and a cytoplasm fraction from the crushed cells. The crushed cells may contain crushed products of other sites such as cytoplasm as long as the crushed cells contain a pellicle of *Bacillus midousuji* cultured in the presence of the chlorinated aromatic compound.

Further, fractions of the crushed cells contain at least a protein exhibiting an activity of decomposing the dioxin and are obtained by extracting the protein exhibiting the dioxin decomposition activity or separating a protein without the dioxin decomposition activity. Examples of methods for extracting or separating such proteins include: separation by a precipitation method such as an ammonium sulfate precipitation method; separation by chromatography such as ionexchange chromatography, affinity adsorption chromatography, and gel filtration chromatography; separation by electrophoresis; and an arbitrary combination of those methods.

In the present invention, the crushed cells can be used as they are by mixing the crushed cells with the contaminated matter or the like. Further, the crushed cells can also be carried on a carrier including: inorganic carriers such as zeolite having an ability of adsorbing organic compounds such as protein and dioxins, active carbon, and hydroxyapatite; and organic polymer-based carriers such as an acrylamide polymer, alginic acid, and carageenan, following a method generally used. The crushed cells can decompose dioxins in the contaminated matter at temperatures allowing activity of *Bacillus midousuji* and at temperatures lower than the temperatures allowing activity of *Bacillus midousuji*. The crushed cells are used preferably in a high temperature environment of 60° C. or above for preventing decomposition by bacteria in the contaminated matter or the aqueous medium.

The contaminated matter cleaned in the present invention is not particularly limited as long as the contaminated matter which comprises dioxins. Examples of such a contaminated matter include fly ash, and soil, gravel, slurry, and liquid containing dioxins.

The aqueous medium used in the present invention is not particularly limited as long as the aqueous medium is water or a fluid medium mainly composed of water. Examples of such an aqueous medium include water comprising a medium, crushed cells of other sites of *Bacillus midousuji*, the carrier, and other additives such as a pH buffer.

The system for cleaning the contaminated matter of the present invention comprises a reaction tank holding at least: the crushed cells or the like comprising a pellicle of *Bacillus midousuji* cultured in the presence of the chlorinated aromatic compound; the contaminated matter comprising dioxins; and the aqueous medium.

The reaction tank is not particularly limited as long as it is a tank capable of holding the crushed cells or the like, the contaminated matter, and the aqueous medium.

Further, the system for cleaning the contaminated matter of the present invention preferably comprises a filtration means for separating the aqueous medium and a solid matter held in the reaction tank and to remove the aqueous medium. The filtration means is not particularly limited as long as it is capable of trapping a solid matter in the aqueous medium. The filtration means is selected depending on the amount or size of the solid matter in the aqueous medium. An example of such a filtration means employs a polyethylene porous membrane having a pore size distribution of 50 μm to 0.03 μm or a hollow fiber membrane, and is in a cylindrical form with both ends sealed with such a membrane. Such a filtration means is submerged under the matter held inside the reaction tank, to thereby discharge the aqueous medium alone into the cylinder. The aqueous medium inside the cylinder is discharged from within the cylinder continuously or at an arbitrary point in time using a pump.

The solid matter such as the contaminated matter and the crushed cells or the like is trapped by the filtration means. Thus, a gas such as air is preferably supplied to the surface of the filtration means using an appropriate means such as a gas cylinder or a blower for preventing clogging of the filtration means by the solid matter in the matter held in the reaction tank.

Further, the system for cleaning the contaminated matter of the present invention preferably comprises a seclusion means for secluding a source of the contaminated matter, a fluid production means for producing a fluid comprising the contaminated matter by soaking the contaminated matter of the source of the contaminated matter in at least water, and a fluid transport means for transporting the fluid comprising the contaminated matter toward the reaction tank. Note that, the source of the contaminated matter refers to an aggregate of the contaminated matter or a matter in which the contaminated matter is adhering to. Examples of such a source of the contaminated matter include soil containing dioxins, incinerators with fly ash adhering thereon or peripheral facilities of the incinerators, and equipment with the contaminated matter adhering along with treatment of the contaminated matter.

The seclusion means is not particularly limited as long as it is a means for secluding the source of the contaminated matter and for preventing scattering of the contaminated matter to the surroundings. The seclusion means can be selected according to the form of the source of the contaminated matter. Examples of such a seclusion means include an airtight sheet for covering the surface of the contaminated soil; and a building having the airtight sheet and an arch frame for supporting the airtight sheet and covering the soil, for covering the structure. The frame only needs to have sufficient strength for constructing the building, and a known frame such as a steel frame can be used as such a frame. Further, a long bag of the airtight sheet filled with pressurized air can be used as the seclusion means, and such a long bag can constitute a roof or wall of the building or the frame.

The fluid production means is not particularly limited as long as it is a means for producing a fluid such as water slurry comprising the contaminated matter prepared by soaking the contaminated matter of the source of the contaminated matter in at least water. Examples of such a fluid production means include a tank for mixing the contaminated soil and the aqueous medium, and a means of washing the contaminated matter for washing down the contaminated matter by jetting at least water to the source of the contaminated matter. Further, examples of the means of washing the contaminated matter include a means for jetting water under high pressure and a means for jetting under high pressure water with abrasive grains introduced.

The fluid transport means is not particularly limited as long as it is a means for transporting the fluid comprising the contaminated matter toward the reaction tank. Examples of such a fluid transport means include a pump.

The system for cleaning the contaminated matter of the present invention may comprise other means in addition to the means described above. Examples of such other means include: a means suitable for enhancing efficiency of cleaning the contaminated matter in the reaction tank; a means suitable for preventing scattering of the contaminated matter from the source of the contaminated matter secluded by the seclusion means; and a means suitable for cleaning the aqueous medium discharged from the reaction tank. Such other means can be realized by utilizing known art.

Examples of the means suitable for enhancing efficiency of cleaning the contaminated matter in the reaction tank include: a premixing tank for mixing the contaminated matter and the crushed cells in advance; a stirring means for mixing the matter held inside the reaction tank; a temperature adjusting means having a heating device for adjusting the temperature of the matter held inside the reaction tank; and a contaminated matter discharging means such as a slurry pump for discharging the contaminated matter in the reaction tank.

The heating device is not particularly limited as long as it is a device capable of heating the matter held inside the reaction tank. Examples of such a heating device include an electronic heater provided at a base and sides of the reaction tank, a jacket with double structured side plates of the tank, a jacket formed with pipes or tubes, and a warm water generator for generating warm water circulating through the jacket.

Examples of the means suitable for preventing scattering of the contaminated matter from the source of the contaminated matter secluded by the seclusion means include: an exhaust means for discharging air inside the seclusion means to the outside; an air purification means for removing pollutants in the air discharged from the seclusion means; and a pressure loss adjusting means for adjusting air pressure inside the seclusion means to negative pressure with respect to the air pressure outside the seclusion means.

Examples of the means suitable for additionally cleaning the aqueous medium discharged from the reaction tank include an ultrafilter for treating the aqueous medium removed from the filtration means and a wastewater treatment means such as an activated sludge tank.

The method of cleaning the contaminated matter comprises mixing the crushed cells or the like comprising a pellicle of *Bacillus midousuji* cultured in the presence of the chlorinated aromatic compound, the contamination, and the aqueous medium, of the present invention, which is in a method of cleaning the contaminated matter comprising dioxins by decomposing the dioxins in the contaminated matter, involves.

Period or order of the mixing of the crushed cells or the like, the contaminated matter, and the aqueous medium is not particularly limited. However, the mixing is preferably conducted before supplying air to the surface of the filtration means when employing the filtration means. In the present invention, all of the crushed cells, the contaminated matter, and the aqueous medium may be mixed simultaneously, or those may be mixed in order. Further, a mixing means is not particularly limited. In the present invention, a means for mixing such as a stirring means can be used as the mixing means. Alternatively, the mixing can be performed by using bubbles of air supplied to the surface of the filtration means.

The mixture is not particularly limited as long as it is a composition mixed in which dioxins in the contaminated matter are mixed so that they can be decomposed by the crushed cells or the like. Examples of such a mixture include water slurry comprising a large amount of the aqueous medium and wet powder comprising a small amount of the aqueous medium. In the present invention, the mixture is preferably water slurry for preventing scattering of the contaminated matter and for easy transport of the contaminated matter.

In the method of cleaning of the present invention, it is preferable that solid matter and the aqueous medium are separated from the mixture, and the aqueous medium without the solid matter is removed. How to remove the aqueous medium without the solid matter is not particularly limited. In the present invention, the aqueous medium may be continuously removed, intermittently removed, removed from the start of supply of the aqueous medium, or removed in accordance with additional supply of the aqueous medium, for example.

The method of cleaning of the present invention preferably comprises secluding the source of the contaminated matter, soaking the contaminated matter generated from the secluded source of the contaminated matter in water, and mixing the crushed cells or the like with the water comprising the contaminated matter.

Soaking the contaminated matter in water may be performed without a particularly special means, and washing wastewater from the source of the contaminated matter or wastewater from a dismantling site of the source of the contaminated matter can be used. Examples of a method of obtaining water comprising the contaminated matter include: a high pressure water washing method for washing away the contaminated matter by jetting water under high pressure to the source of the contaminated matter; and a wet sandblast method for washing away the contaminated matter by jetting water and abrasive grains under high pressure to the source of the contaminated matter.

In the method of cleaning of the present invention, a point at which the amount of dioxins in the contaminated matter falls below the standard can be defined as the end point. The amount of dioxins in the contaminated matter can be measured through a GC/MS method specified by JIS K0311 or JIS K0312. However, an enzyme immunoassay described below is preferable for rapidly determining the amount of dioxins. A commercially available analysis kit can be used for such an enzyme immunoassay, and examples of the analysis kit include Eco Assay Dioxin (ELISA kit, available from Otsuka Pharmaceutical Co., Ltd.). However, the composition of the aqueous medium affects detection results of the enzyme immunoassay. Thus, calibration curves are preferably prepared according to the composition of the aqueous medium in advance, for determining the amount of dioxins in the contaminated matter using the calibration curves.

Hereinafter, the enzyme immunoassay will be described.

<A Method for Quantitating the Dioxins Suitably Used in the Present Invention>

The method for quantitating comprises: acting a biotin-labeled dioxin solution of known concentration labeled with biotin and a sample of unknown concentration on a light transmitting stationary phase having a polyclonal antibody which recognizes dioxins and which is fixed thereon; and coloring the biotin-labeled dioxin reacting with the antibody. Thus, dioxin concentration in the sample is determined utilizing a competitive reaction. In the method for quantitating, biotin-labeled 2,3,7-trichlorodibenzo-p-dioxin (2,3,7-TCDD) is suitable used as biotin-labeled dioxin.

To be specific, Eco Assay Dioxin (ELISA kit, available from Otsuka Pharmaceutical Co., Ltd.) is used. Each well of a stationary phase plate is washed three times with 300 μL of wash. 50 μL of the biotin-labeled dioxin solution of known concentration and 50 μL of the sample which is an object of quantification are added to each well, and the solutions in each well are stirred by shaking or the like. The stationary phase plate is sealed for a reaction at 4° C. for 20 hours. After the reaction, each well is washed three times with wash, and 100 μL of enzyme-labeled streptavidin (peroxidase) is added to each well. The stationary phase plate is then sealed for a reaction at room temperature for 2 hours. After the reaction, each well is washed three times with wash, and 100 μL of an enzyme reaction substrate liquid is added to each well. The stationary phase plate is then sealed for a reaction at room temperature for 20 minutes in a dark place. A dispensing time of the enzyme reaction substrate liquid is adjusted so that a reaction time of each well becomes exactly 20 minutes. Absorbance of light having a wavelength of 450 nm is measured for each well. The method for quantitating allows quantification of the amount of dioxins in the sample within the measuring range of 4.1 ng/mL to 1,000 ng/mL. However, the reaction temperature and reaction time vary somewhat depending on the kind of dioxins.

The calibration curves can be prepared by using samples containing dioxins of various known concentration as the samples which is an object of quantification. Further, the calibration curves reflecting effects of additives on measurements can be prepared by using samples containing dioxins of known concentration and various additives of different concentration as the samples which is an object of quantification. Further, sensitivity of dioxins by kind to 2,3,7-TCDD can be determined by using samples of known concentration containing various kinds of dioxins as the samples which is an object of quantification. According to the method for quantitating, 2,3,7,8-tetrachlorodibenzo-p-dioxin (2,3,7,8-TCDD) has approximately equivalent sensitivity to that of 2,3,7-TCDD. Thus, the results of the method for quantitating can be written in 2,3,7,8-TCDD equivalents by multiplying the obtained values by ratios of the sensitivity according to the kind of dioxins.

The method of cleaning of the present invention can be conducted using the system for cleaning the contaminated matter of the present invention described above. However, other various means can be employed depending on a form of the mixture or of the source of the contaminated matter. Examples of other means that may be applied to the cleaning method of the present invention include an apparatus for cleaning a contaminated matter disclosed in JP 2002-301466 A.

Further, the method of cleaning of the present invention need not use the reaction tank described above when the source of the contaminated matter is soil. Such a method of cleaning can be conducted by: secluding the contaminated soil by the seclusion means; dispersing the crushed cells in the contaminated soil inside the seclusion means; and stirring the contaminated soil with the stirring means such as a screw stirrer.

As is clear from the above description, the system for cleaning the contaminated matter and the method of cleaning of the present invention can be applied to various forms of contaminated matter generated from washing operation or dismantling operation of facilities which generate dioxins such as a waste incineration facility before improvement or from soil conditioning or the like at a vacant lot of such a facility.

Further, the present invention provides a preparation for decomposing dioxins which comprises crushed cells or fractions thereof comprising a pellicle of *Bacillus midousuji* cultured in the presence of the chlorinated aromatic compound. The preparation for decomposing dioxins of the present invention can be prepared by crushing of the cells of the *Bacillus midousuji* as described above, or extraction or separation of a protein from the crushed cells obtained through crushing of the bacterial cells.

The preparation for decomposing dioxins of the present invention can employ the crushed cells or the like as they are, or in a form of being carried by the carrier described above. An appropriate amount of the preparation for decomposing dioxins of the present invention is used depending on various conditions such as the form of the contaminated matter comprising dioxins, the kind of dioxins in the contaminated matter, the temperature during a decomposition reaction, and the form of the preparation for decomposing dioxins.

The present invention allows decomposition of dioxins having three or more chlorine atoms in the contaminated matter by mixing the crushed cells or the like comprising a pellicle of *Bacillus midousuji* cultured in the presence of the chlorinated aromatic compound having a substituent comprising an oxygen atom bonded to an aromatic ring and having a chloro group bonded to an aromatic ring, the contaminated matter, and the aqueous medium, for cleaning the contaminated matter comprising dioxins by decomposing the dioxins in the contaminated matter. Thus, the present invention allows easy cleaning of the contaminated matter at a site of dioxin generation such as a washing or dismantling site of an incineration facility.

Further, according to the present invention, separating the solid matter and the aqueous medium from the mixture to remove the aqueous medium without the solid matter allows control of contact between the crushed cells or the like and the contaminated matter, which is even more effective for enhancing efficiency of cleaning the contaminated matter.

Further, according to the present invention, secluding the source of the contaminated matter, soaking the contaminated matter generated from the secluded source of the contaminated matter in water, and mixing the crushed cells or the like with the water comprising the contaminated matter allow prevention of scattering of the contaminated matter from the source of the contaminated matter and during transport of the contaminated matter, which is even more effective for cleaning the contaminated matter comprising dioxins at a site such as a dismantling site of an incinerator or a soil conditioning site at a vacant lot of an incineration facility.

Further, according to the present invention, mixing of the crushed cells or the like with the water slurry comprising the contaminated matter discharged through one method of a high pressure water washing method for washing away the contaminated matter by jetting water under high pressure to the source of the contaminated matter and a wet sandblast method for washing away the contaminated matter by jetting water and abrasive grains under high pressure to the source of the contaminated matter allows use of washing wastewater of the contaminated matter adhering to facilities during dismantling of an incinerator or improvement work of an incineration facility, which is even more effective for cleaning the contaminated matter at the site with a simple constitution.

Further, the present invention provides a preparation for decomposing dioxins which comprises crushed cells or fractions thereof comprising a pellicle of *Bacillus midousuji* cultured in the presence of the chlorinated aromatic compound. The present invention provides a novel preparation for decomposing dioxins capable of decomposing dioxins having three or more chlorine atoms in the contaminated matter and easily cleaning the contaminated matter at a site of dioxin generation such as a washing or dismantling site of an incineration facility.

DESCRIPTION OF THE PREFERRED EMBODIMENTS

A cleaning system having a wastewater cleaning treatment capacity of 5 $m^3$/day will be described below as a system for cleaning the contaminated matter according to an embodiment of the present invention.

Figure 1:
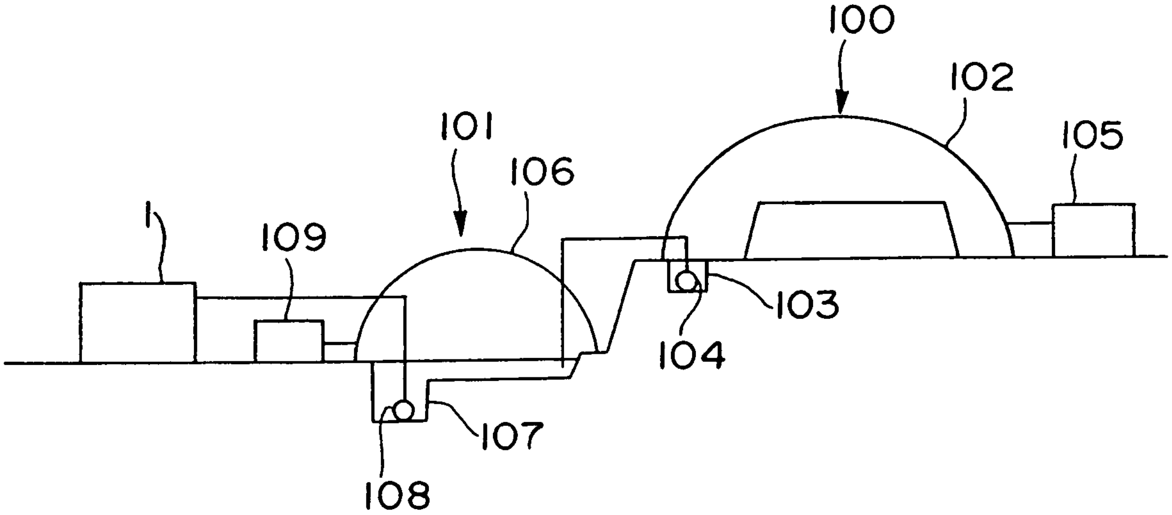
FIG. 1 is a diagram showing a whole constitution of a system for cleaning the contaminated matter according to an embodiment of the present invention.

The cleaning system according to the embodiment comprises a dismantling or high pressure washing site 100, a vehicle or equipment washing site 101, and a contaminated matter cleaning device 1 as shown in FIG. 1.

The dismantling or high pressure washing site 100 comprises: a seclusion building 102 for covering a facility dismantled or high pressure washed; a wastewater pit 103 for collecting wastewater generated in the seclusion building 102; a pump 104 for feeding the wastewater in the wastewater pit 103 to the vehicle or equipment washing site 101; and an exhaust device 105 for discharging air inside the seclusion building 102 to the outside.

The vehicle or equipment washing site 101 comprises: a seclusion building 106 for covering a facility for washing vehicles or equipment; a wastewater pit 107 for collecting wastewater generated in the seclusion building 106 and wastewater from the dismantling or high pressure washing site 100 fed by the pump 104; a pump 108 for feeding the wastewater in the wastewater pit 107 to the contaminated matter cleaning device 1; and an exhaust device 109 for discharging air inside the seclusion building 106 to the outside.

The seclusion buildings 102 and 106 are semi-cylindrical buildings having structures covering a semi-circular frame such as steel frame with airtight sheets of resin or fabric. The seclusion buildings may be constructed by introducing pressurized air into an airtight long bag of resin or fabric and expanding the long bag to serve as a roof, the frame, walls, and the like.

Figure 2:
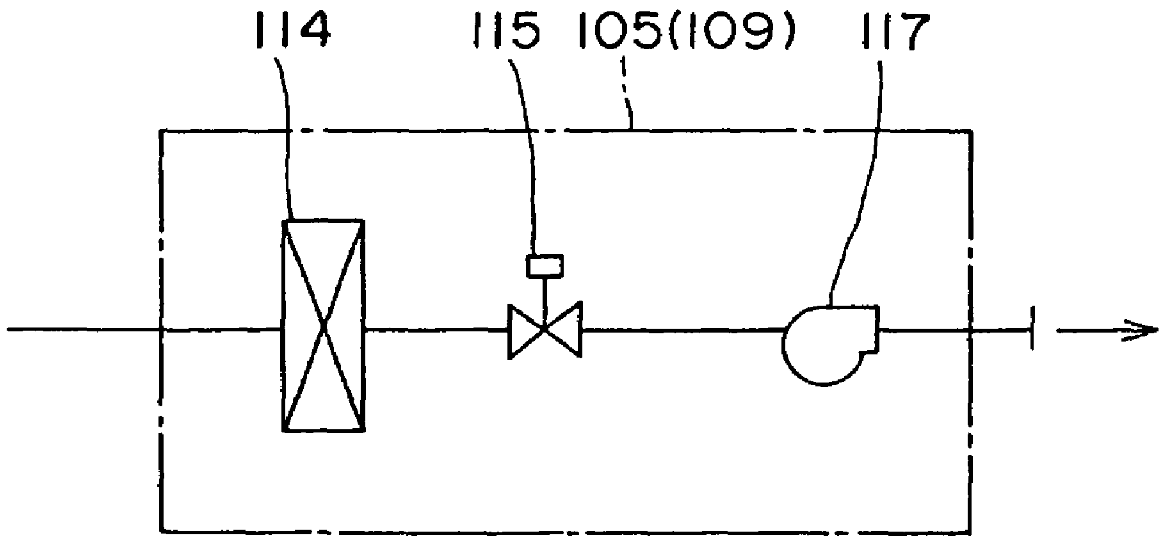
FIG. 2 is a schematic diagram showing a constitution of an exhaust device employed in the system for cleaning shown in FIG. 1.
Figure 3:
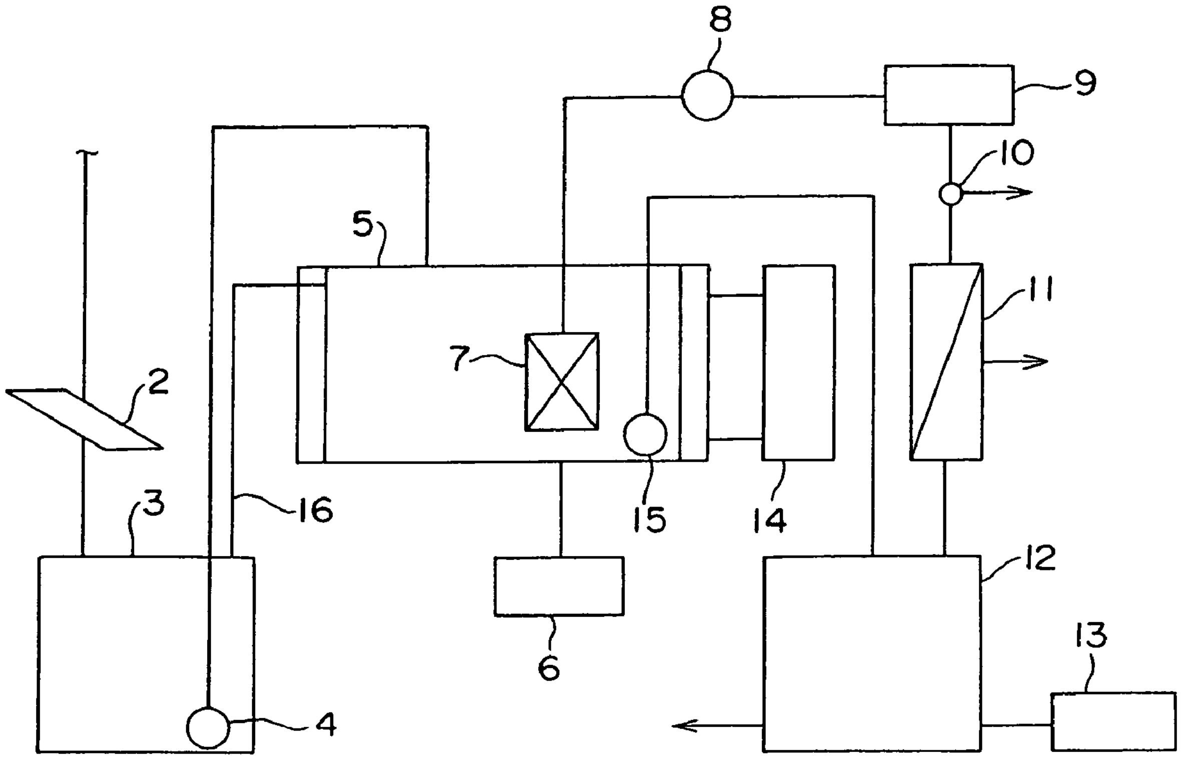
FIG. 3 is a schematic diagram showing a constitution of a cleaning device 1 employed in the system for cleaning shown in FIG. 1.

The exhaust devices 105 and 109 are each provided with a medium-performance filter 114, an automatic valve 115, a fan 117, and an air discharge passage 118 for discharging the air inside the seclusion buildings to the outside as shown in FIG. 2, for example. The automatic valve 115 is connected to, for example, a differential pressure gauge (not shown) for detecting a pressure difference between air pressure inside the seclusion building and atmospheric pressure. The automatic valve 115 maintains the air pressure inside the seclusion building at negative pressure to the atmospheric pressure according to detection results of the differential pressure gauge. An amount of exhaust from the seclusion building is controlled by an output of the fan or an opening of the automatic valve, for example.

The contaminated matter cleaning device 1 comprises: a mesh screen 2 for removing a solid matter having a relatively large particle size such as abrasive grains or rubbles from the wastewater fed from the pump 108; a raw water tank 3 for holding the wastewater from which the solid matter having a large particle size is removed by the mesh screen 2; a reaction tank 5 provided with a jacket through which a heat medium circulates, for holding the wastewater from the raw water tank 3 fed through a pump 4; a blower 6 for supplying air to the wastewater held in the reaction tank 5; a submerged membrane 7 for removing the wastewater without the solid matter having a small particle size from the wastewater held in the reaction tank 5; an ultrafilter 11 to which the wastewater removed from the submerged membrane 7 is fed through a pump 8, a flowmeter 9, and a scupper 10; an activated sludge tank 12 for holding the solid matter filtered and separated by the ultrafilter 11; a blower 13 for supplying air to the activated sludge tank 12; a heating device 14 connected to the jacket of the reaction tank 5, for heating the heat medium inside the jacket; a pump 15 for sucking the solid matter accumulated at a base portion of the reaction tank 5 and feeding the solid matter to the activated sludge tank 12; and an overflow line 16 for returning the wastewater of the reaction tank 5 above a prescribed level to the raw water tank 3.

The raw water tank 3 has a diameter of 2.2 m, a height of 2 m, and a capacity of 5 $m^3$. The pumps 4 and 8 each have a liquid transport capacity of 5 $m^3$/h. The reaction tank 5 has a diameter of 3 m, a height of 2 m, and a capacity of 10 $m^3$. The blower 6 has a blast capacity of 25 $m^3$/h. Warm water capable of accordingly adjusting the temperature of the wastewater held in the reaction tank 5 is used as the heat medium circulating through the jacket of the reaction tank 5, for example.

The blower 6 supplies air to the base portion of the reaction tank 5 which is directly below the submerged membrane 7. The submerged membrane 7 is provided at a position at which the membrane submerges under water when the reaction reactor 5 holds the wastewater. The submerged membrane 7 is a type of a microfilter which is a hollow cylinder having a peripheral wall and end walls formed by a polyethylene porous membrane having a pore size distribution of 50 μm to 0.03 μm or a hydrophilic hollow fiber membrane.

The ultrafilter 11 consists of, for example, a filter of a polyacrylonitrile copolymer having a pore size distribution of 0.3 μm to 0.001 μm. The activated sludge tank 12 holds, for example, aerobic microorganisms for decomposing organic matters such as protein. The activated sludge tank 12 has a diameter of 2.2 m, a height of 2 m, and a capacity of 5 $m^3$. The blower 13 has a blast capacity of 1 $m^3$/h.

Next, a description will be give of a method of cleaning the contaminated matter comprising dioxins, generated at a dismantling or washing site or the like, using the cleaning system described above. First, preparation of crushed cells comprising a pellicle of *Bacillus midousuji* employed in cleaning of the contaminated matter will be described. The crushed cells are obtained by culturing a large amount of *Bacillus midousuji* in factories or the like, crushing the obtained bacterial cells of the *Bacillus midousuji*, and then separating the crushed bacterial cells.

Figure 4:
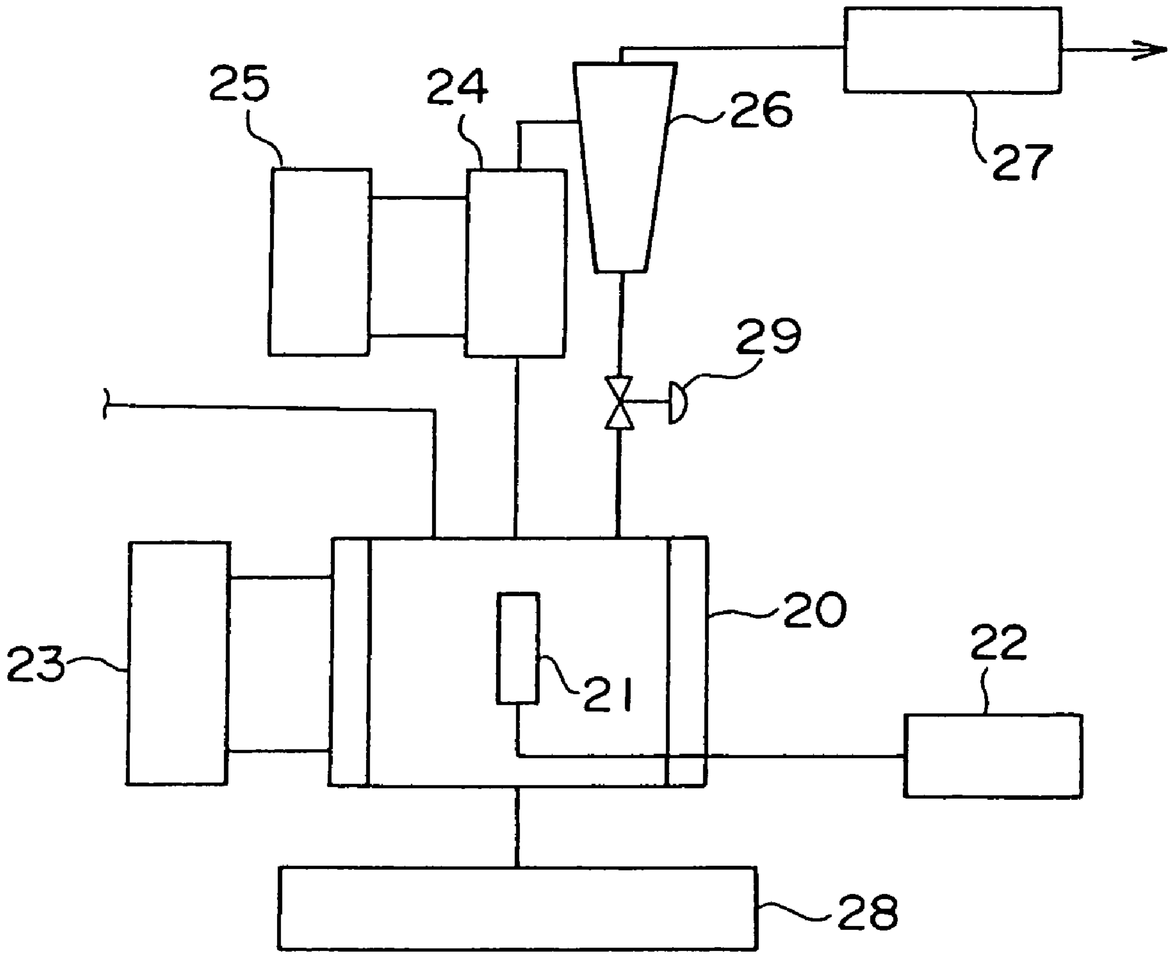
FIG. 4 is a schematic diagram showing a constitution of a device employed in an embodiment of the present invention for preparing crushed cells comprising a pellicle of *Bacillus midousuji* cultured in the presence of a chlorinated aromatic compound having a substituent comprising an oxygen atom bonded to an aromatic ring and having a chloro group bonded to an aromatic ring.
Figure 5:
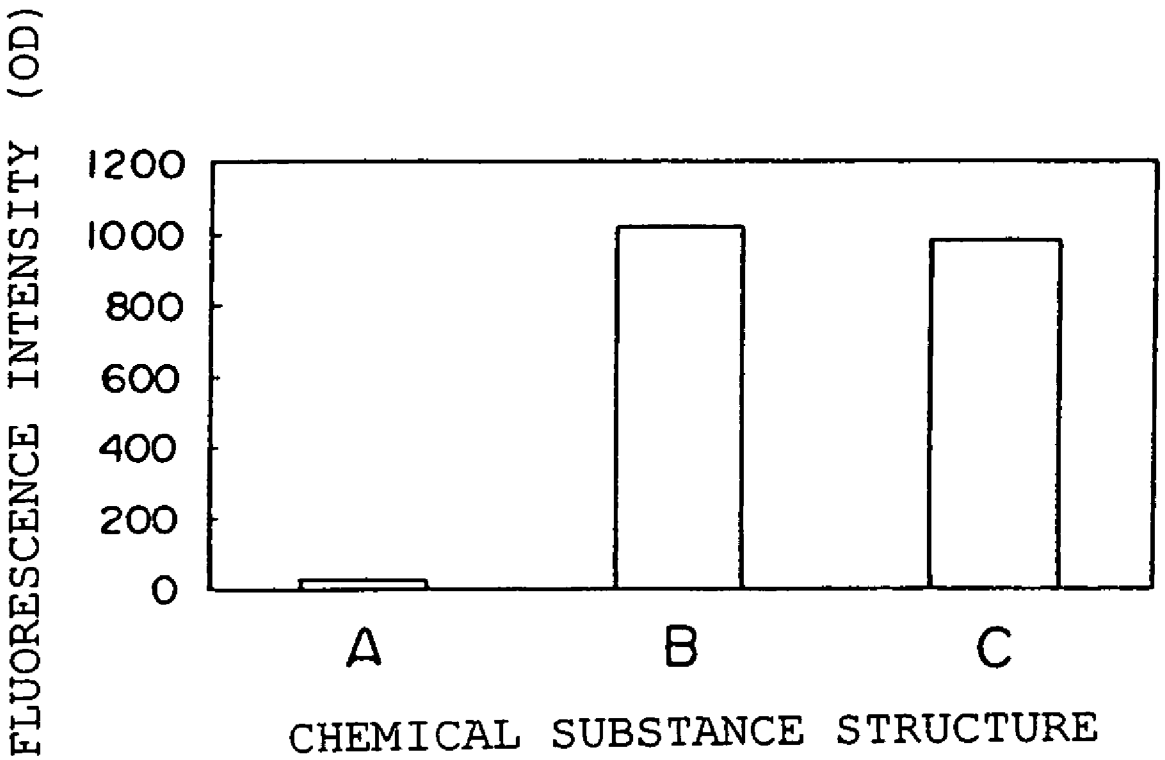
FIG. 5 is a diagram showing fluorescence intensities at a wavelength of 450 nm of compounds used in studies on decomposed parts of dioxins and kinds of crushed cells, and excited by a light having a wavelength of 360 nm.

A device shown in FIG. 4, for example, is used for the preparation of the crushed cells. The device comprises: a culture tank 20 for holding a liquid medium, fly ash, strains, and the like; a draft tube 21 which submerges in the matter held in the culture tank 20; a blower 22 for supplying air to the draft tube 21; a heating device 23 for heating a heat medium circulating through a jacket provided in the culture tank 20 and for controlling the temperature of the matter held in the culture tank 20 to a temperature allowing activity of *Bacillus midousuji*; a cooler 24 for cooling exhaust from the culture tank 20 with a circulating cooling medium; a cooling device 25 for cooling the cooling medium circulating through the cooler 24; a gas-liquid separator 26 for separating a gas and mist from the exhaust cooled by the cooler 24; a removal device 27 for removing dioxins from the exhaust separated by the gas-liquid separator 26; an ultracentrifuge 28 for separating the crushed cells comprising a pellicle from the crushed cells of *Bacillus midousuji*; and a two-way valve 29 for opening and closing a line returning a liquid separated by the gas-liquid separator 26 to the culture tank 20.

The culture tank 20 has a diameter of 0.5 m, a height of 1 m, and a capacity of 0.1 $m^3$. The draft tube 21 is used for mixing the matter held in the culture tank 20 and the air and for forming convection of air bubbles in the matter held in the culture tank 20. The draft tube 21 is provided for the purpose of promoting gas-liquid contact inside the culture tank 20, maintaining dissolved oxygen concentration of the matter held in the culture tank 20 to the maximum, and accelerating stirring of the liquid medium. The blower 22 has a blast capacity of 6 $m^3$/h. The heating device 23 has a heating capacity of 12 kW. The cooler 24 is provided with a plate heat exchanger. The gas-liquid separator 26 is a cyclone type gas-liquid separator. The removal device 27 is an adsorber filled with activated carbon.

First, 0.1 $m^3$ of water is poured into the culture tank 20. Next, air is supplied to the culture tank 20 from the blower 22 through the draft tube 21. The water in the culture tank 20 is heated by the heating device 23 to 65° C., which is an optimum temperature for *Bacillus midousuji*. The temperature of the water in the culture tank 20 is controlled to 65° C. as a control target value by adjusting the flow rate of the heat medium circulating through the jacket by PID action or two-position action based on deviation between measured values of the temperature of the matter held and control target value.

The temperature of the water inside the culture tank 20 maintained at 65° C. causes discharge of water vapor and mist generated from disappearance of air bubbles, in exhaust. The cooling device 25 cools the cooling medium circulating through the cooler 24 to about 15° C., and the discharged water vapor is cooled by the cooler 24 and returned to the culture tank 20 as water. The mist is separated from the exhaust by the gas-liquid separator 26 and returned to the culture tank 20 as water. A water content accumulated in the gas-liquid separator 26 is returned to the culture tank 20 by opening the two-way valve 29 interlocked with stopping of the blower 22. A reverse flow of the water content from the gas-liquid separator 26 while returning the water content to the culture tank 20 or of the matter held in the culture tank 20 such as the liquid medium by interlocking The stopping of the blower 22, that is, the stopping the activity of the microorganisms in the culture tank 20, and the opening of the two-way valve 29.

The exhaust from which the water content is removed to some degree by the gas-liquid separator 26 is fed to the removal device 27. When the exhaust contains a slight amount of organic matters such as dioxins, the removal device 27 adsorbs the organic matters and discharges the exhaust from which those organic matters are removed to the atmosphere.

The supply of air by the blower 22 is stopped once after the temperature of the water in the culture tank 20 has been maintained at 65° C. A Soybean Casein Digest Broth medium, soybean protein, molasses, and the like are added to the culture tank 20, to thereby prepare a liquid medium. Next, fly ash as a supply source of dioxins, a fresh culture strain of *Bacillus midousuji*, DMSO, $Ca^{2+}$, yeast, zeolite, pH regulator, and the like are added to the culture tank 20 to resume operation of the blower 22. Note that, a *Bacillus midousuji* SH2B-J2 strain is employed as the fresh culture strain of *Bacillus midousuji* according to the embodiment of the present invention.

The concentration of the liquid medium, which is a nutrient source of *Bacillus midousuji*, in the culture tank 20 is 3 mass % or more since an effect of medium concentration on proliferation of *Bacillus midousuji* is very slight when the concentration of the liquid medium in the culture tank 20 is 3 mass % or more.

Further, the concentration of calcium ions in the culture tank 20 for promoting energy metabolism of *Bacillus midousuji* to activate a proliferation reaction is 50 mmol/L or more since the effect of calcium ion concentration on proliferation activity of *Bacillus midousuji* is very slight when the concentration of calcium ions in the culture tank 20 is 50 mmol/L or more.

Further, the concentration of DMSO in the culture tank 20 for inhibiting protease activity to act on bacteriolysis inhibition of *Bacillus midousuji* is 30 mL/L (3%) since growth inhibition of *Bacillus midousuji* is observed when the concentration of DMSO in the culture tank 20 is 30 mL/L or more.

Hereinafter, conditions in culturing the SH2B-J2 strain in the culture tank 20 in the presence of dioxins (fly ash) are determined as described below through similar studies on concentration of various additives in the culture tank 20 and various conditions and effects thereof.

<Culture conditions>

| | |
|---|---|
| Optimum temperature | 65° C. |
| pH control range | 6.0 to 7.5 |
| Initial concentration of Bacillus midousuji | 1 × $10^7$cells/mL |
| Liquid medium concentration | 3 mass % or more |
| $Ca^{2+}$ addition concentration | 50 mmol/L or more |
| DMSO addition concentration | 30 mL/L (3%) |
| Zeolite addition concentration | 50 g/L or more |
| Culture time | 3 to 4 hours |
| Fly ash addition concentration | 1 g/L |

The culture device described above is operated for 3 to 4 hours to culture *Bacillus midousuji*. The dissolved oxygen concentration and sugar concentration in the matter held in the culture tank 20 are measured from start of the culture, and progress of the culture of *Bacillus midousuji* is evaluated from the measurements. When the culture of *Bacillus midousuji* progresses normally, phenomena such as a sharp drop of the dissolved oxygen concentration at a later stage of a logarithmic growth phase and a logarithmic decrease of the sugar concentration with proliferation of *Bacillus midousuji* are observed.

The end point of the culture of *Bacillus midousuji* is determined from the phenomena described above, and bacterial cells of *Bacillus midousuji* are then crushed. The bacterial cells of *Bacillus midousuji* are crushed by introducing a cell membrane degrading enzyme to the culture tank 20 or with a cell crusher for crushing cells through ultrasonic vibration or the like. The obtained crushed cells are separated by the ultracentrifuge 28 into contaminants such as fly ash and medium, cytoplasmic proteins which are crushed cells comprising cytoplasm, and pellicle proteins which are crushed cells comprising a pellicle, from a lower layer.

Next, a description will be given of cleaning of the contaminated matter comprising dioxins and discharged with dismantling or washing of a facility using the obtained crushed cells and employing the contaminated matter cleaning device 1 described above.

For example, an incinerator, which is a source of the contaminated matter comprising dioxins, is washed using a high pressure water washing method or a wet sandblast method inside the seclusion building 102 at the dismantling or washing site 100. Alternatively, the washed incinerator is dismantled using a wire sawing method, for example, to thereby discharge the wastewater including the contaminated matter comprising dioxins. The wastewater from the dismantling or washing site 100 is collected at the wastewater pit 103 and fed to the vehicle or equipment washing site 101.

Conveying machines such as a belt conveyor or operation vehicles such as a bulldozer used at the dismantling or washing site 100 are washed with water inside the seclusion building 106 at the vehicle or equipment washing site 101, to thereby discharge the wastewater including the contaminated matter comprising dioxins. The wastewater from the vehicle or equipment washing site 101 combines with the wastewater from the dismantling or washing site 100 to be collected at the wastewater pit 107 and fed to the contaminated matter cleaning device 1.

A facility washed or dismantled at the dismantling or washing site is secluded from the surroundings by the seclusion building 102. A facility for washing at the vehicle or equipment washing site is secluded from the surroundings by the seclusion building 106. Further, air pressures inside the seclusion buildings 102 and 106 are maintained at negative pressures to the atmospheric pressure by the exhaust devices 105 and 109. Therefore, the contaminated matter comprising dioxins such as fly ash are prevented from emitting to the atmosphere from the seclusion buildings 102 and 106.

The wastewater fed from the vehicle or equipment washing site 101 is supplied to the mesh screen 2. The mesh screen 2 removes a solid matter having a relatively large particle size such as abrasive grains used in a wet sandblast method or rubbles discharged with dismantling from the supplied wastewater. The wastewater from which such a solid matter is removed is fed to the raw water tank 3. The water level of the raw water tank 3 is measured using an electrode level meter and is maintained between a low level and a high level through an operation of the pump 108. Note that, physical properties of the fed wastewater may be adjusted by, for example, addition of an appropriate additive to the raw water tank 3 if the fed wastewater has physical properties causing denaturation of proteins.

The wastewater fed to the raw water tank 3 is fed to the reaction tank 5 by the pump 4. The water level of the reaction tank 5 is measured using an electrode level meter, and the wastewater excessively supplied to the reaction tank 5 is returned to the raw water tank 3 through the overflow line 16.

The wastewater in the reaction tank 5 is heated to an suitable temperature by the jacket to which warm water heated by the heating device 14 is supplied. Further, supplied to the reaction tank 5 are the crushed cells comprising a pellicle of *Bacillus midousuji* cultured in the presence of the chlorinated aromatic compound such as dioxins or chlorinated phenol. Further, air is supplied to the reaction tank 5 from the blower 6. As described above, dioxins are decomposed by the crushed cells in the reaction tank 5.

Note that, other crushed cells obtained through separation of the crushed cells comprising a pellicle may be used for the decomposition of dioxins by: supplying contaminants such as other crushed cells such as crushed cells comprising cytoplasm obtained through separation of the crushed cells comprising a pellicle, contaminants such as the medium and fly ash to the reaction tank 5 along with the crushed cells comprising a pellicle; or supplying the other crushed cells or contaminants to the raw water tank 3.

The mixture containing the wastewater and the crushed cells in the reaction tank 5 is stirred by air supplied from the blower 6. The air supplied from the blower 6 elevates along the surface of the submerged membrane 7 as fine air bubbles. The mixture turns brown and darker with the progress of the dioxin decomposition by the crushed cells.

The decomposition reaction of dioxins by the crushed cells is conducted over 18 hours in the reaction tank 5. Then, the amount of dioxins in the mixture in the reaction tank 5 is measured by the enzyme immunoassay in 2,3,7,8-TCDD equivalents to confirm that the amount of dioxins sufficiently satisfies the wastewater standards. Inorganic and organic solid matters having a particle size of 0.4 μm or more are filtered from the mixture using the submerged membrane 7 by operating the pump 8, and the wastewater is discharged as purified water from the scupper 10 to sewer.

The solid matter in the mixture is filtered by the submerged membrane 7, but on the other hand, the blower 6 supplies air from directly below the submerged membrane 7. Thus, in the filtration of the mixture using the submerged membrane 7, clogging of the submerged membrane 7 is prevented because the bubbles of the air supplied from the blower 6 elevate along the surface of the submerged membrane 7.

The wastewater fed to the scupper 10 is fed to the ultrafilter 11 in case of the maintenance of the submerged membrane 7 or when further purified wastewater is needed. The wastewater fed to the ultrafilter 11 permeates a membrane while flowing along the surface of a filtration membrane of the ultrafilter 11, to thereby obtain wastewater without a solid matter having a smaller particle size. The obtained wastewater is discharged as purified water to the sewer.

The solid matter (sludge) accumulated at the base portion of the reaction tank 5 is supplied to the activated sludge tank 12 by the operation of the pump 15. Further, the solid matter separated by the ultrafilter 11 is also supplied to the activated sludge tank 12. The air is supplied from the blower 13 into the activated sludge tank 12, and an aerobic environment is maintained inside the activated sludge tank 12. Organic contaminants such as proteins and the medium are decomposed by the activities of microorganisms in the activated sludge tank 12.

The amount of sludge accumulation in the activated sludge tank 12 is monitored, and the accumulated sludge is accordingly carried from the activated sludge tank 12. The carried sludge is recycled as an eco-cement, for example.

According to the embodiment, the crushed cells comprising a pellicle of *Bacillus midousuji* cultured in the presence of the chlorinated aromatic compound, the contaminated matter comprising dioxins, and the aqueous medium are mixed. The crushed cells break an ether bond between two benzene rings, which is a characteristic structure of dioxins. Thus, the crushed cells can decompose dioxins having three or more chlorine atoms, which is perceived difficult to decompose with microorganisms exhibiting dioxin decomposition activity such as a white-rot fungus.

Further, according to the embodiment, the cleaning method is hardly affected by a cleaning environment such as a temperature or salt concentration compared to the cleaning methods employing microorganisms, because the crushed cells are used for the decomposition of dioxins. For example, the crushed cells are capable of decomposing dioxins at temperatures lower than temperatures allowing activity of *Bacillus midousuji*, and even in an environment with high salt concentration. Therefore, the contaminated matter can be easily cleaned at a site of dioxin generation such as a washing or dismantling site of an incineration facility.

Further, according to the embodiment, the crushed cells acting on dioxin decomposition are used for the decomposition of dioxins. In a cleaning method employing the microorganisms, the existence and proliferation of microorganisms may affect the cleaning of the contaminated matter, and dioxins may not be decomposed quantitatively with respect to the amount of microorganisms added. On the other hand, in the embodiment, dioxins can be decomposed quantitatively with respect to the amount of the crushed cells added, and the contaminated matter can be easily cleaned.

Further, according to the embodiment, the aqueous medium from which the solid matter is removed by the submerged membrane 7 is produced. Thus, the concentration of the slurry in the reaction tank 5 can be easily controlled, and the contaminated matter can be efficiently cleaned.

Further, according to the embodiment, the source of the contaminated matter is secluded by the seclusion building from the surrounding environment, and the contaminated matter generates inside the seclusion building as included in water to produce water slurry which can be used for cleaning of the contaminated matter. Thus, the water slurry comprising the contaminated matter can be easily obtained.

Further, according to the embodiment, inclusion of the heating device 14 allows control of the temperature of the matter held in the reaction tank 5 during the decomposition reaction depending on the kind or the like of the dioxins as decomposition objects, for enhancing dioxin decomposition activity of the crushed cells. Thus, the contaminated matter can be decomposed efficiently.

Further, according to the embodiment, the air pressures inside the seclusion buildings are controlled to negative pressures to the atmospheric pressure. Thus, the air inside the seclusion buildings does not leak to the outside even when the seclusion buildings are slightly opened for entering or exiting by an operator, for example, and scattering of the contaminated matter to the surrounding environment can be prevented.

Further, according to the embodiment, inclusion of the heating device 14 allows suitable adjustment of the temperature of the matter held in the reaction tank 5 at an arbitrary time. Therefore, the wastewater in the reaction tank 5 can be disinfected by heating the wastewater before introduction of the crushed cells into the reaction tank 5, to thereby prevent decomposition of the crushed cells by bacteria in the wastewater.

Further, according to the embodiment, inclusion of the heating device 14 allows control of the temperature of the matter held in the reaction tank 5 during the decomposition reaction depending on the kind or the like of the dioxins as decomposition objects, for enhancing dioxin decomposition activity of the crushed cells. Thus, the contaminated matter can be decomposed efficiently.

Hereinbelow, studies conducted by the inventors of the present invention regarding crushed cells of which parts decompose dioxins among the crushed cells of *Bacillus midousuji* cultured in the presence of the chlorinated aromatic compound such as dioxins and dioxins of which parts are decomposed will be described.

<Studies on Decomposition Parts of Dioxins and Parts of Cells of *Bacillus midousuji* for Decomposing Dioxins>

The following studies were conducted for verifying crushed cells of which parts decompose dioxins among the crushed cells of *Bacillus* and dioxins of which parts are decomposed. A dioxin-like fluorescent substrate having a characteristic structure of dioxins and crushed cells of *Bacillus midousuji* cultured under various conditions were reacted under various conditions, and the presence of dioxin decomposition products under each of the conditions was detected. The method is disclosed in an article ("Screening of novel dioxin decomposer microorganism", collected papers from annual conference of Japan Society for Bioscience, Biotechnology, and Agrochemistry, p. 153, 2001) by Masaya Nakamura or in JP 2002-348291 A.

First, the dioxin-like fluorescent substrate having a structure similar to dioxins was synthesized (following structural formula A). The dioxin-like fluorescent substrate A was synthesized by bonding through ether bonds, the benzene ring of dichlorobenzene and a benzene ring of 6,7-dihydroxy-4-methylchromen-2-one (following structural formula C, hereinafter, the compound will be referred to as "esculetin-like compound"). The dioxin-like fluorescent substrate A has a structure containing two ether bonds bonding two benzene rings, which is a characteristic structure of dioxins.

(A)

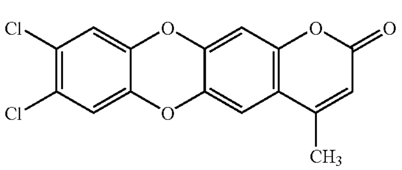

(B)

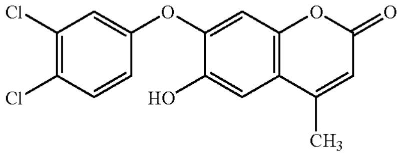

(C)

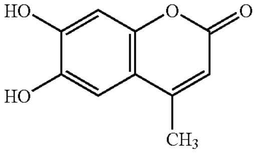

The dioxin-like fluorescent substrate A forms a fluorescent substance B represented by the structural formula (B) if one of the two ether bonds bonding dichlorobenzene and esculetin C breaks, and forms an esculetin-like compound C if both of the two ether bonds break. Irradiation of those substances A to C with light having a wavelength of 360 nm results in substantially no fluorescence emission with the dioxin-like fluorescent substrate A, but results in excitation of the fluorescent substance B and the esculetin-like compound C and strong fluorescence emission at a wavelength of 450 nm.

*Bacillus midousuji* used was a fresh culture strain obtained by sampling a glycerin stock culture on a Soybean-Casein Digest Broth agar plate medium with a platinum loop and culturing at 65° C. for 3 hours. The glycerin stock culture was a strain obtained by: isolating a primary SH2B-J2 strain in Osaka City in 1995, suspending the strain in glycerin, and subjecting the strain to cryopreservation at −85° C.; and culturing the strain using the Soybean-Casein Digest Broth agar plate medium in 2001, resuspending the strain in glycerin, and subjecting the strain to cryopreservation at −85° C.

One loop of the fresh culture strain was sampled using a small quantitative platinum loop and the whole sampled strain was mixed to 15 mL of a liquid medium in a 50 mL conical tube. 3 mass % of Soybean-Casein Digest Broth and 0.3 mass % of yeast were used as the liquid medium (hereinafter, a liquid medium of this composition is referred to as "liquid medium A"). The conical tube was installed radially on a disc of a disc-type rotating cultivator (manufactured by Taitec Corporation). The conical tube was continuously inverted, to thereby mix and condition a fresh bacterial culture. The fresh bacterial culture was mixed and conditioned under conditions of 65° C., 20 rpm, and 2 hours using the device described above.

The 15 mL of the obtained fresh bacterial culture and 500 mL of the liquid medium A were placed in a 3 L flask, and *Bacillus midousuji* was cultured using a shaker (manufactured by Taitec Corporation). *Bacillus midousuji* was cultured under the conditions of 65° C., horizontal "figure-of eight" rotations at 190 rpm, and 3 hours. Note that, in the bacterial culture of *Bacillus midousuji*, two kinds of the bacterial culture, one including 1 mg/mL of fly ash added, and the other without fly ash, were used. The fly ash was sampled at an incinerator and contained 1 ng-TEQ/g of dioxins.

The obtained bacterial culture was immediately cooled on ice and centrifuged under the conditions of 4° C., 4,300 G, and 20 minutes using a centrifuge (manufactured by Beckman Coulter, Inc.). The obtained bacterial cell sediment was resuspended in a liquid medium obtained by diluting the liquid medium A by four fold and cooling on ice (hereinafter, the liquid medium is referred to as "liquid medium B"), and was the suspension was placed in a 50 mL conical tube.

The obtained suspension was centrifuged under the conditions of 4° C., 6,000 rpm, and 10 minutes using a centrifuge (manufactured by Sakuma Seisakusho, Ltd.), to thereby obtain a bacterial cell sediment.

The obtained bacterial cell sediment was resuspended in 15 mL of the liquid medium B, and cells of *Bacillus midousuji* in the obtained suspension were crushed four times using an ultrasonic crusher (manufactured by Nippon Seiki Co., Ltd.) under the conditions of 20 kHz, 150 W, and 2 minutes while being cooled on ice. The suspension after the crushing was centrifuged under the conditions of 4° C., 6,000 rpm, and 10 minutes using a centrifuge (manufactured by Sakuma Seisakusho, Ltd.), to thereby obtain an untreated bacterial cell sediment and supernatant.

The obtained supernatant was sampled into test tubes for ultracentrifuge in 4 mL portions, and was centrifuged under the conditions of 4° C., 150,000 G, and 30 minutes using an ultracentrifuge (manufactured by Hitachi, Ltd.). Crushed cells containing a pellicle (hereinafter, referred to as "pellicle fraction") were sampled from an upper layer portion of the obtained sediment, and crushed cells containing cytoplasm (hereinafter, referred to as "cytoplasm fraction") were sampled from a lower layer portion of the obtained sediment.

A reaction liquid was obtained by: adding 200 μL of the pellicle fraction or cytoplasm fraction and 700 μL of the liquid medium B in 7 mL screw-cap glass test tubes; further adding 100 μL of dimethylsulfoxide (DMSO) having dissolved therein 100 μg of the dioxin-like fluorescent substrate A or DMSO such that the final concentration of the fraction in the reaction liquid becomes 5 mass %; and leaving the mixture at stand at a prescribed temperature for a prescribed time period.

After the reaction liquid had been left at stand, 50 μL of 12 N hydrochloric acid was added to the reaction liquid. 1 mL of ethyl acetate was added to the reaction liquid, and the whole was mixed well and centrifuged under the conditions of 3,000 rpm and 20 minutes. An ethyl acetate layer of the obtained supernatant was collected. The procedure was repeated three times, and the ethyl acetate layer was evaporated to dryness. The obtained dried product was redissolved in ethyl acetate, and 15 μL of the redissolved liquid was sampled using a glass capillary, dropped onto a silica gel plate for thin layer chromatography, and developed using a developing solvent. The developing solvent used was a solvent obtained by mixing chloroform, ethyl acetate, and formic acid in a ratio of 10:8:1.

Figure 6:
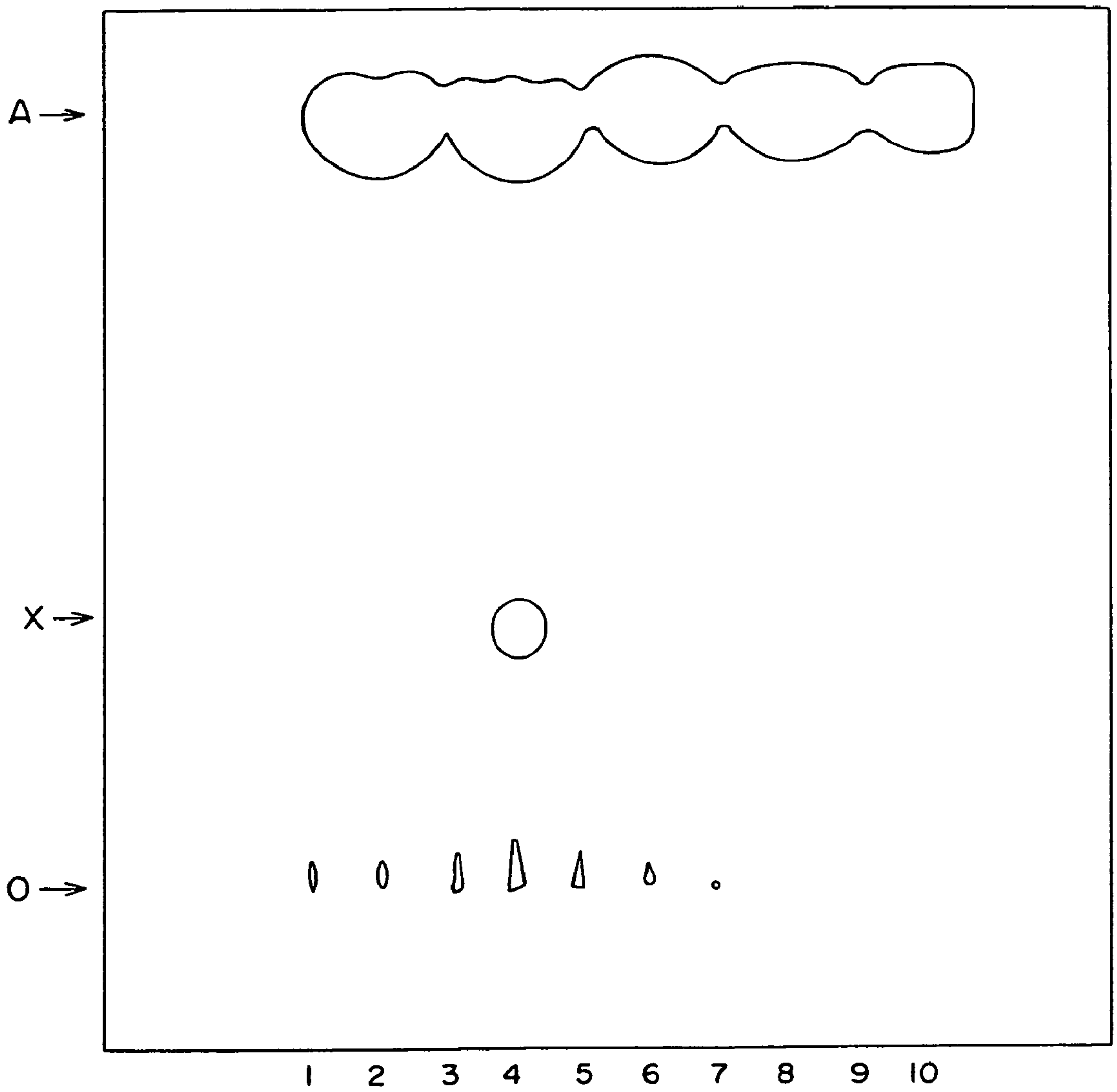
FIG. 6 is a diagram showing spots formed by dropping reaction liquids obtained under various conditions onto a silica plate and developed, in studies on decomposed parts of dioxins and kinds of crushed cells.

FIG. 6 shows the results of the thin layer chromatography. Further, Table 1 shows the conditions of the ethyl acetate solutions dropped on respective lanes of the silica gel plate shown in FIG. 6.

TABLE 1

| Lane | Kind of crushed cells | Culture condition | Reaction conditions: Reaction time | Reaction conditions: Reaction temperature | Presence of dioxin-like fluorescent substrate A |
|---|---|---|---|---|---|
| 1 | Pellicle | Without fly ash | 5 days | 65° C. | None |
| 2 | Pellicle | Without fly ash | 5 days | 65° C. | Present |
| 3 | Pellicle | With fly ash | 18 hours | 65° C. | None |
| 4 | Pellicle | With fly ash | 18 hours | 65° C. | Present |
| 5 | Cytoplasm | With fly ash | 18 hours | 65° C. | None |
| 6 | Cytoplasm | With fly ash | 18 hours | 65° C. | Present |
| 7 | Pellicle | Without fly ash | 18 hours | 65° C. | None |
| 8 | Pellicle | Without fly ash | 18 hours | 65° C. | Present |
| 9 | Cytoplasm | Without fly ash | 18 hours | 65° C. | None |
| 10 | Cytoplasm | Without fly ash | 18 hours | 65° C. | Present |

In FIG. 6, spots (O) in a lower portion represent drop positions of the dissolved liquid, and large spots (A) in an upper portion represent the developed dioxin-like fluorescent substrate A. A spot (X) was observed between the spots O and spots A in the lane 4 only.

Figure 7:
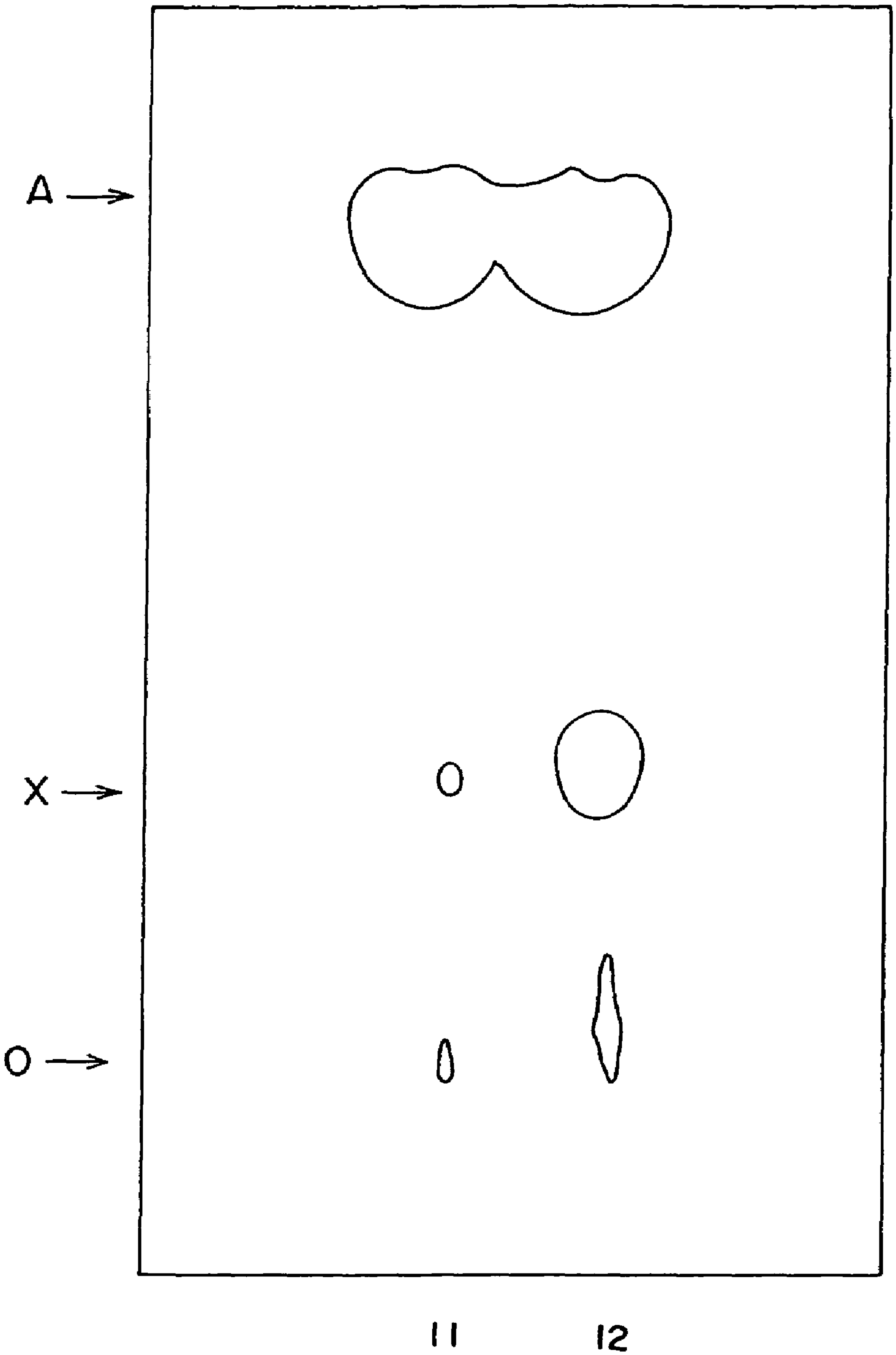
FIG. 7 is a diagram showing spots formed by dropping reaction liquids obtained under various reaction conditions within the conditions providing a spot X onto a silica plate and developed, in studies on decomposed parts of dioxins and kinds of crushed cells.

Further, FIG. 7 shows the results of the thin layer chromatography under different reaction conditions of the pellicle fraction of *Bacillus midousuji* cultured by adding fly ash with the dioxin-like fluorescent substrate A. In FIG. 7, the lane 11 represents the developed redissolved liquid after a reaction at 18° C. for 20 minutes, and the lane 12 represents the developed redissolved liquid after a reaction at 65° C. for 18 hours. FIG. 7 shows that a spot X having higher brightness was observed in the lane 12 than in the lane 11.

The above results including the position of the spot X and the conditions of the thin layer chromatography confirmed that a substance shown at the spot X is a substance having higher polarity than that of the dioxin-like fluorescent substrate A. Further, the substance shown at the spot X emits strong fluorescence. Thus, the substance is probably at least one of the fluorescent substance B and the esculetin-like compound C or a compound similar thereto. Further, the substance shown at the spot X is detected more with the pellicle fraction of *Bacillus midousuji* cultured at 65° C. Thus, the substance is probably one acted by a substance formed by the activity of *Bacillus midousuji* cultured under the conditions having fly ash added.

Further, measurement of the spot X by a GC/MS method confirmed that the substance shown at the spot X is a substance having a naphthoquinone-like structure and a structure containing a sulfate group. Therefore, the measurement confirmed that the substance shown at the spot X is a compound similar to the esculetin-like compound C.

The results confirmed that the pellicle fraction of *Bacillus midousuji* cultured in the presence of the chlorinated aromatic compound such as dioxins breaks the ether bond bonding the two benzene rings, which is a characteristic structure of dioxins.

Further, the more active the activity of *Bacillus midousuji*, the more conspicuous the breakage of the ether bonds. Thus, an enzyme produced by *Bacillus midousuji* probably breaks the ether bonds. The results of the GC/MS method suggest that the ether bonds are broken by glutathione-s-transferase or arylsulfotransferase, which are enzymes produced through a bio-defense reaction for detoxifying a foreign matter to microorganisms because a sulfate group is introduced in accordance with the breakage of the ether bond.

Further, in a reaction between the pellicle fraction and the dioxin-like fluorescent substance A, the reaction liquid turns brown overall and turns darker with progress of the reaction. Thus, an iron-requiring respiratory reaction of cytochrome probably proceeds.

What is claimed is:

1. A method of cleaning contaminated matter comprising dioxins by decomposing the dioxins in the contaminated matter, wherein the method comprises:

culturing *Bacillus midousuji* by a process comprising: mixing a dioxin-containing substance comprising fly ash with a medium comprising a nutrient source of *Bacillus midousuji,* supplying oxygen to the medium, and controlling the temperature of the medium to 62° C. or above, which allows activity of the *Bacillus midousuji;* crushing cells of *Bacillus midousuji* that were cultured in the culturing step, to obtain crushed cells of *Bacillus midousuji;* subjecting the crushed cells of *Bacillus midousuji* to centrifugation to separate the crushed cells into a pellicle fraction comprising crushed cells containing a pellicle, and a cytoplasm fraction comprising crushed cells containing cytoplasm; and mixing the pellicle fraction, the contaminated matter, and an aqueous medium, wherein the pellicle of *Bacillus midousuji* breaks the ether bond of the structure of the dioxins.

2. The method according to claim 1, wherein the method comprises:

separating a solid matter and the aqueous medium from the mixture to obtain the aqueous medium in which the solid matter is removed.

3. The method according to claim 1, wherein the method comprises:

secluding a source of the contaminated matter;

soaking the contaminated matter generated from the secluded source of the contaminated matter in water; and mixing the pellicle fraction with the water comprising the contaminated matter.

4. The method according to claim 2, wherein the method comprises:

secluding a source of the contaminated matter;

soaking the contaminated matter generated from the secluded source of the contaminated matter in water; and mixing the pellicle fraction with the water comprising the contaminated matter.

5. The method according to claim 3, wherein the pellicle fraction is mixed with water slurry comprising the contaminated matter discharged through one method of a high pressure water washing method for washing the contaminated matter down by jetting water under high pressure to the source of the contaminated matter and a wet sandblast method for washing the contaminated matter down by jetting water and abrasive grains under high pressure to the source of the contaminated matter.

6. The method according to claim 4, wherein the pellicle fraction is mixed with water slurry comprising the contaminated matter discharged through one method of a high pressure water washing method for washing the contaminated matter down by jetting water under high pressure to the source of the contaminated matter and a wet sandblast method for washing the contaminated matter down by jetting water and abrasive grains under high pressure to the source of the contaminated matter.

7. A preparation for decomposing dioxins, the preparation being prepared by a process comprising the steps of: culturing *Bacillus midousuji* by a process comprising mixing a dioxin-containing substance comprising fly ash with a medium comprising a nutrient source of *Bacillus midousuji*, supplying oxygen to the medium, and controlling the temperature of the medium to 62° C. or above, which allows activity of the *Bacillus midousuji*; crushing cells of *Bacillus midousuji* that were cultured in the culturing step, and subjecting the crushed cells of *Bacillus midousuji* to centrifugation to separate the crushed cells into a pellicle fraction comprising crushed cells containing a pellicle, and a cytoplasm fraction comprising crushed cells containing cytoplasm, the preparation comprising the pellicle fraction of *Bacillus midousuji,* which breaks the ether bond of the structure of the dioxins.

* * * * *

UNITED STATES PATENT AND TRADEMARK OFFICE

CERTIFICATE OF CORRECTION

PATENT NO. : 7,598,074 B2
APPLICATION NO. : 10/804746
DATED : October 6, 2009
INVENTOR(S) : Hoshina et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1413 days.

Signed and Sealed this

Fourteenth Day of December, 2010

David J. Kappos

*Director of the United States Patent and Trademark Office*